United States Patent [19]
Abe et al.

[11] Patent Number: 6,130,785
[45] Date of Patent: *Oct. 10, 2000

[54] EYEPIECE LENS SYSTEM

[75] Inventors: Tetsuya Abe, Hokkaido; Koichi Maruyama, Saitama-ken, both of Japan

[73] Assignee: Asahi Kogaku Kogyo Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/081,819

[22] Filed: May 20, 1998

[30] Foreign Application Priority Data

May 21, 1997 [JP] Japan .................................. 9-147273

[51] Int. Cl.[7] .............................. G02B 25/00; G02B 5/18
[52] U.S. Cl. .......................... 359/646; 359/570; 359/574; 359/644; 359/645
[58] Field of Search ..................................... 359/643, 644, 359/645, 646, 647, 558, 565–576

[56] References Cited

U.S. PATENT DOCUMENTS 5,151,823   9/1992   Chen ........................................ 359/565
5,446,588   8/1995   Missig et al. ........................... 359/645

OTHER PUBLICATIONS

E. Brown, "Modern Optics" (New York: Reinhold Publishing Corporation, 1965), pp. 239–243.

Stone et al., "Hybrid diffractive–refractive lenses and achromats", "Applied Optics", vol. 27, No. 14, Jul. 15, 1998, pp. 2960–2971.

Primary Examiner—Scott J. Sugarman
Attorney, Agent, or Firm—Greenblum & Bernstein, P.L.C.

[57] ABSTRACT

There is provided an eyepiece lens system for viewing an image formed by an objective lens system. The eyepiece lens system includes a first refraction lens having a positive power, a second refraction lens having a positive power and at least one diffraction lens having a phase grating structure. The first and second lenses are arranged on an eye side with respect to a plane on which the image is formed.

11 Claims, 11 Drawing Sheets

SPHERICAL ABERRATION
CHROMATIC ABERRATION

LATERAL CHROMATIC ABERRATION

ASTIGMATISM

DISTORTION

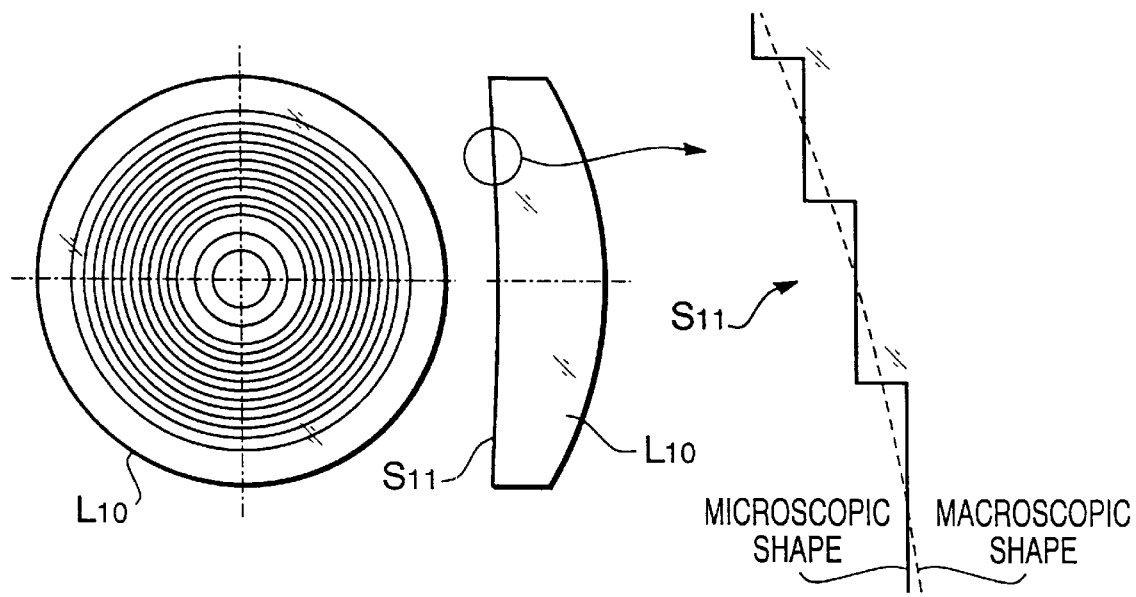
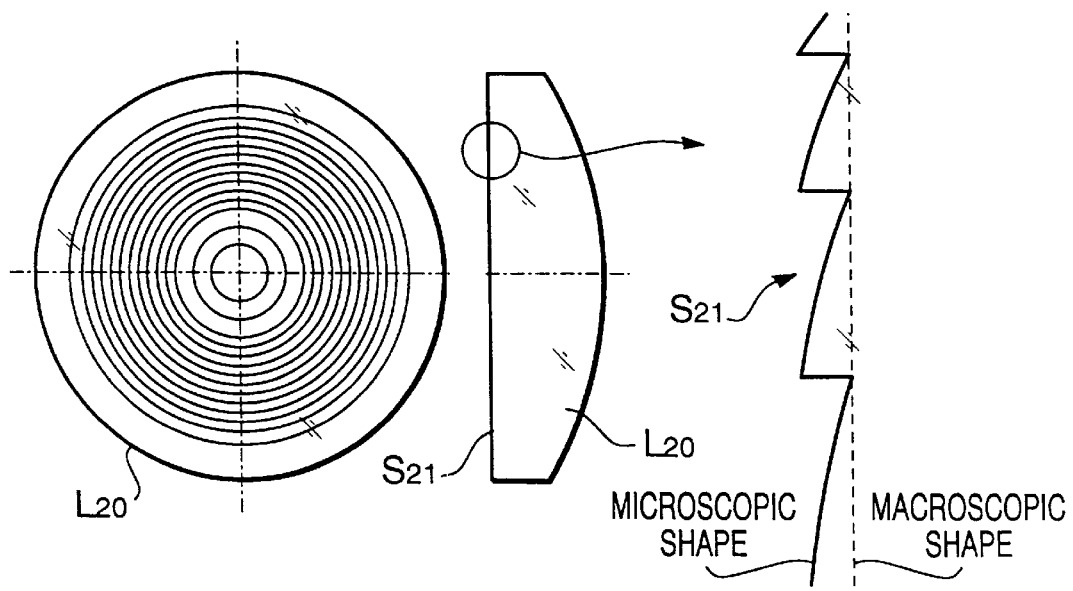

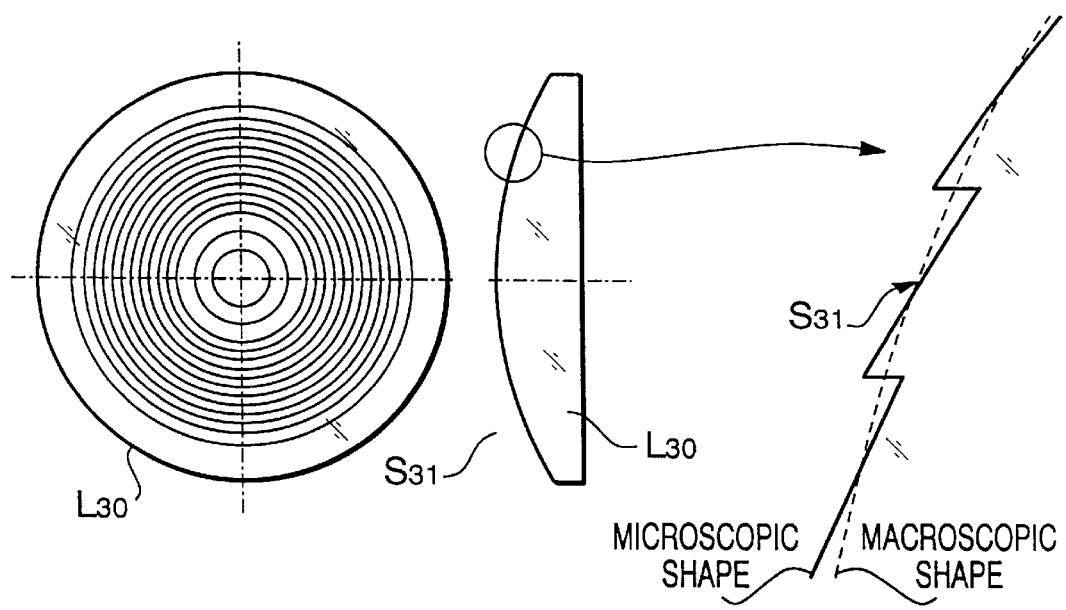

FIG. 6
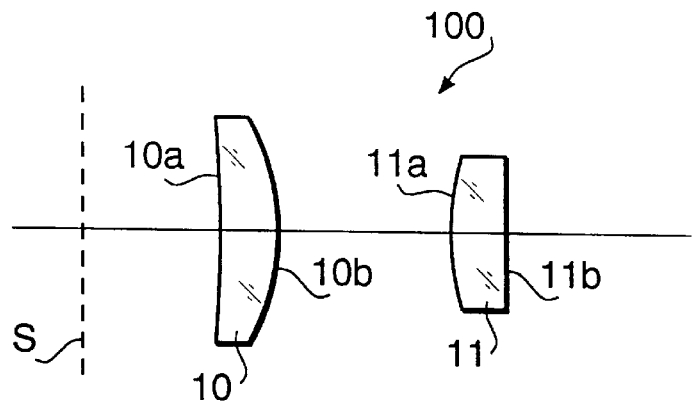
FIG. 7A  FIG. 7B  FIG. 7C  FIG. 7D
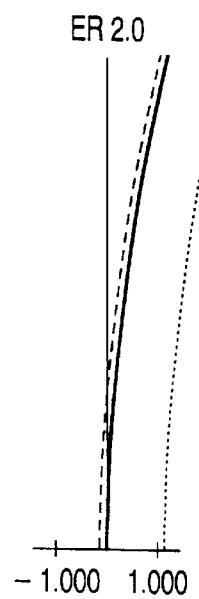
SPHERICAL
ABERRATION
CHROMATIC
ABERRATION
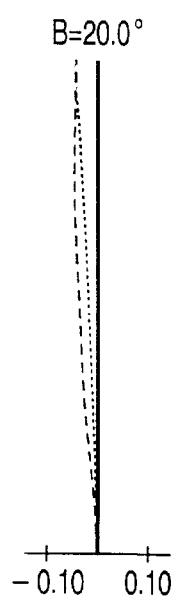
LATERAL
CHROMATIC
ABERRATION
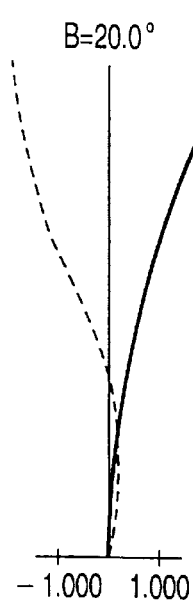
ASTIGMATISM
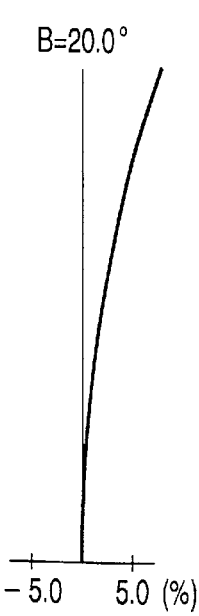
DISTORTION FIG. 8
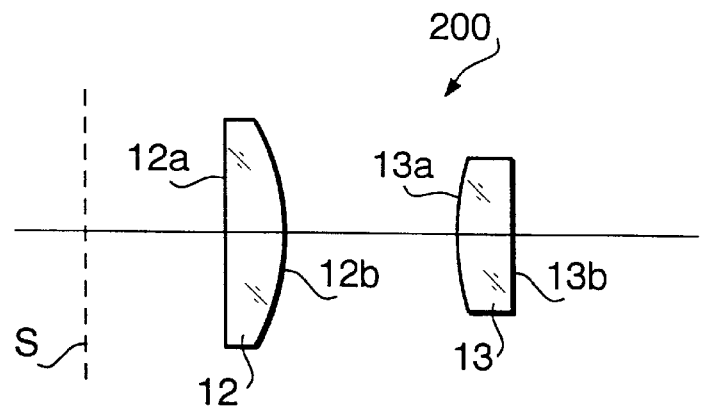
FIG. 9A   FIG. 9B   FIG. 9C   FIG. 9D
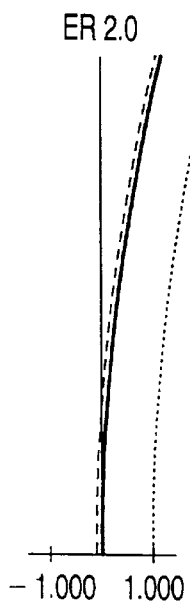
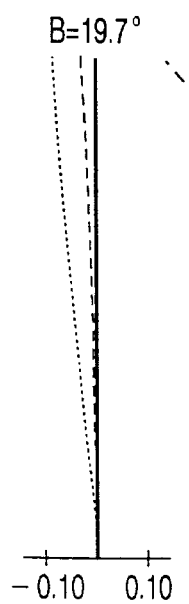
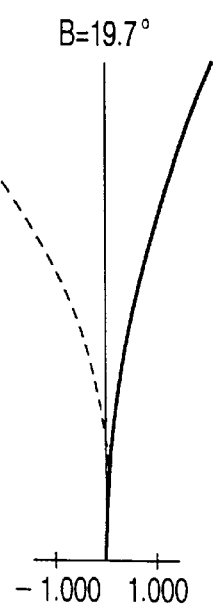
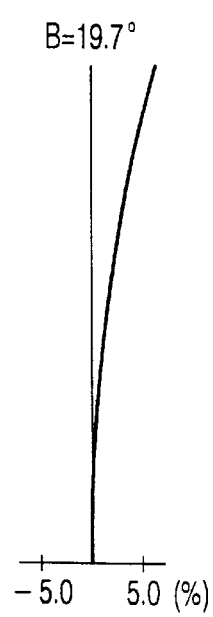
SPHERICAL ABERRATION CHROMATIC ABERRATION
LATERAL CHROMATIC ABERRATION
ASTIGMATISM
DISTORTION FIG. 10
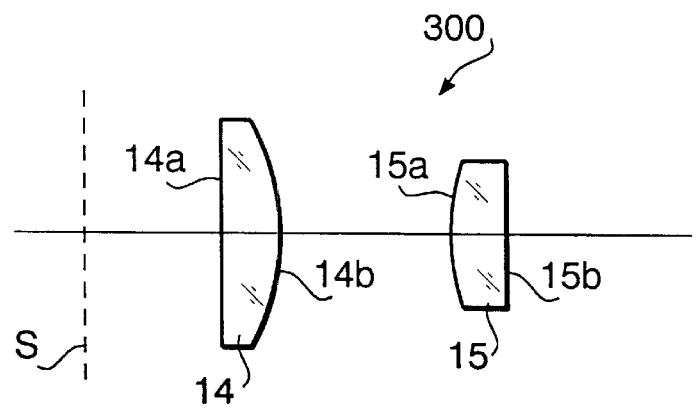
FIG. 11A   FIG. 11B   FIG. 11C   FIG. 11D
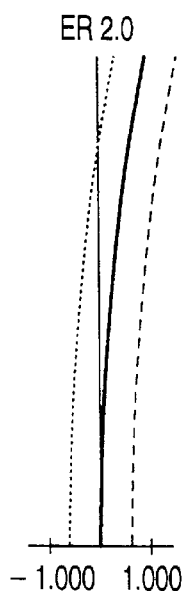
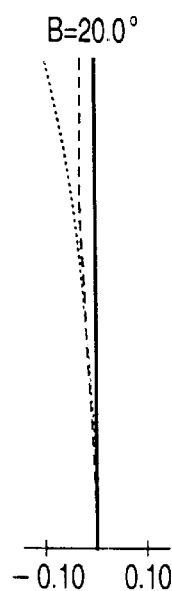
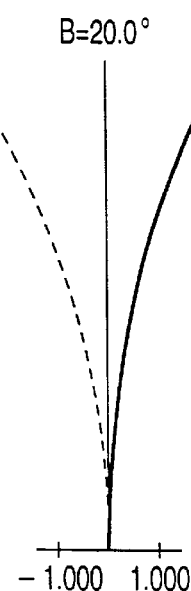
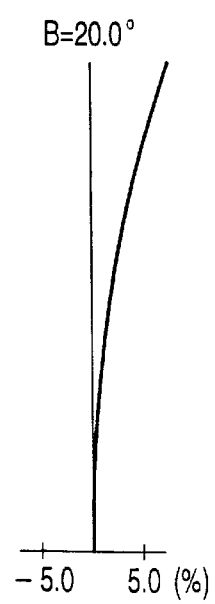
SPHERICAL ABERRATION CHROMATIC ABERRATION | LATERAL CHROMATIC ABERRATION | ASTIGMATISM | DISTORTION FIG. 12
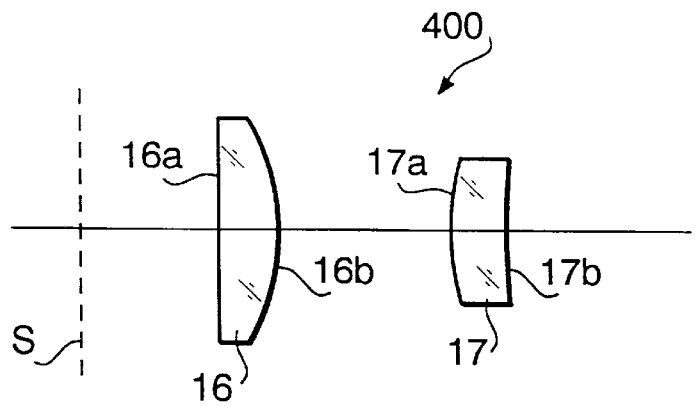
FIG. 13A  FIG. 13B  FIG. 13C  FIG. 13D
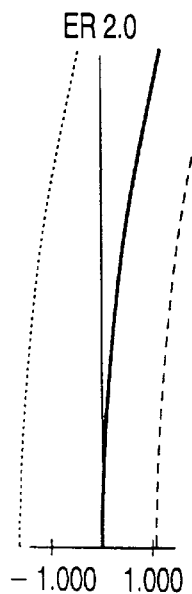
SPHERICAL ABERRATION CHROMATIC ABERRATION
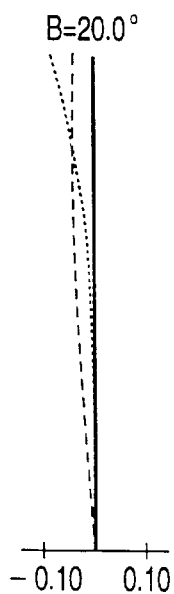
LATERAL CHROMATIC ABERRATION
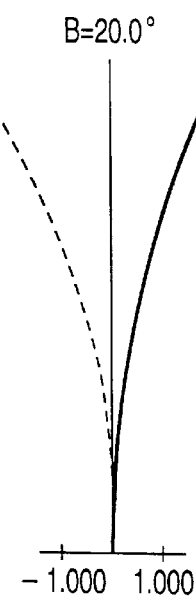
ASTIGMATISM
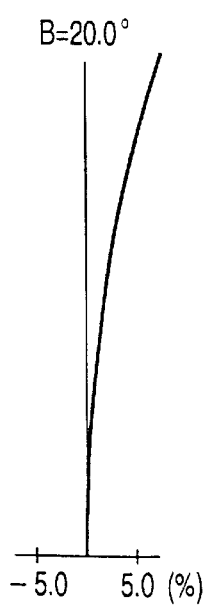
DISTORTION

SPHERICAL ABERRATION CHROMATIC ABERRATION

LATERAL CHROMATIC ABERRATION

ASTIGMATISM

DISTORTION

SPHERICAL ABERRATION
CHROMATIC ABERRATION

LATERAL CHROMATIC ABERRATION

ASTIGMATISM

DISTORTION

FIG. 18
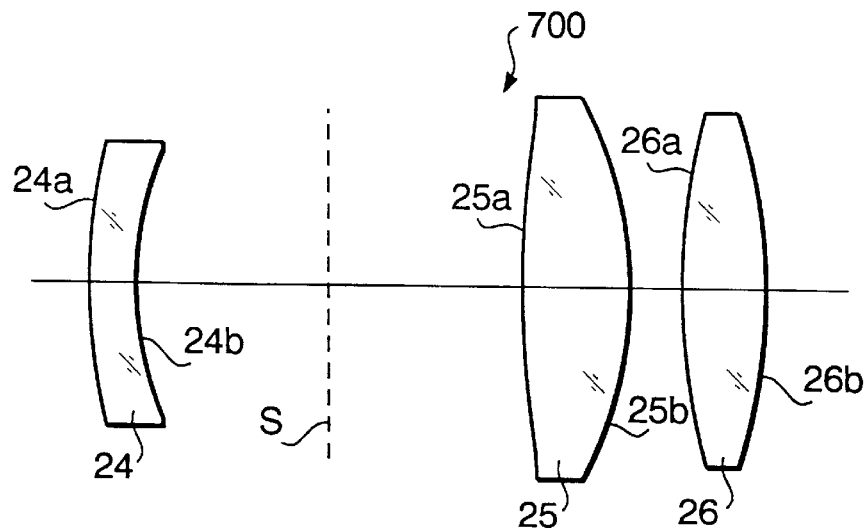
FIG. 19A   FIG. 19B   FIG. 19C   FIG. 19D
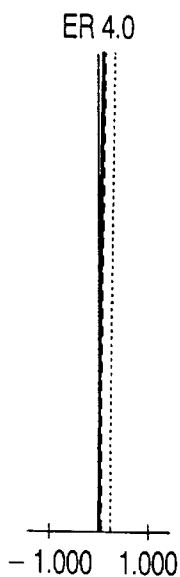
SPHERICAL
ABERRATION
CHROMATIC
ABERRATION
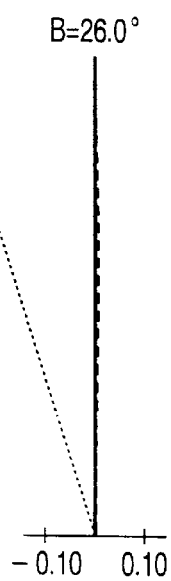
LATERAL
CHROMATIC
ABERRATION
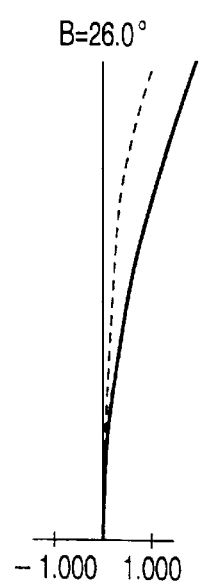
ASTIGMATISM
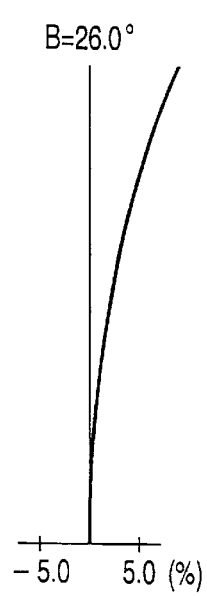
DISTORTION

SPHERICAL ABERRATION
CHROMATIC ABERRATION

LATERAL CHROMATIC ABERRATION

ASTIGMATISM

DISTORTION

EYEPIECE LENS SYSTEM

BACKGROUND OF THE INVENTION

The present invention relates to an eyepiece lens system applicable to a viewing optical systems having relatively a wide viewing angle, such as astronomical telescopes and binoculars.

The eyepiece lens system is generally arranged between a real image formed by an objective lens system and an eye of an observer, or between a displaying element such as an LCD or CRT and the eye to magnify the real image or the displayed image. The eyepiece lens system should be constructed such that an exit pupil thereof is located outside the lens on the eye side in order to provide a sufficient eye relief. Therefore, in the eyepiece lens system, coma, curvature of field, and lateral chromatic aberration tend to occur relatively easily.

A Ramsden eyepiece lens system has been conventionally known as an eyepiece lens system that has a simple structure and is inexpensive. The Ramsden eyepiece lens system is constructed such that two plano-convex lenses having the same focal length are arranged to be apart by a distance equal to the focal length thereof, with making the convex surfaces thereof face each other. In the Ramsden eyepiece lens system, accordingly, the lateral chromatic aberration can be suppressed theoretically.

However, the Ramsden eyepiece lens system provides a relatively short eye relief, and the eye of the observer focuses on a planar surface of the piano-convex lens arranged on the object side. Therefore, dust or a flaw on the planner surface of the lens may be conspicuous in the field of view. In order to reduce such drawback, conventionally, when the Ramsden eyepiece lens system is used, the focal lengths of the two lenses are made different and/or a distance between the two lenses may be changed so as not to satisfy the above-described condition.

FIG. 1 shows a lens diagram illustrating a modified Ramsden eyepiece lens system which has been conventionally used. An object is located on a left-hand side of the drawing. The eyepiece lens system shown in FIG. 1 has a first plano-convex lens 1, and a second piano-convex lens 2, both having the same focal length and convex surfaces thereof facing each other.

Table 1 indicates the numerical structure of the eyepiece lens system shown in FIG. 1. In Table 1, ER denotes a diameter of an eye ring, B denotes an angle of emitted light with respect to an optical axis of the eyepiece lens, f denotes a focal length of the eyepiece lens system, r denotes a radius of curvature of each surface of lenses of the eyepiece lens system, d denotes a distance between surfaces (i.e., a distance between lenses or a thickness of the lenses), n denotes a refractive index with respect to a d-line (588 nm), v denotes an Abbe's number of each lens. S indicates that a field stop is provided. It should be noted that in this example of Table 1, a distance d2 between two lenses 1 and 2 is shorter than the focal length f of the entire eyepiece lens system.

TABLE 1

ER = 2.0 mm    B = ±20.0°    f = 10.01 mm

| Surface Number | r | d | n | v |
|---|---|---|---|---|
| S | — | 4.82 | | |
| 1 | — | 2.00 | 1.49176 | 57.4 |
| 2 | −8.000 | 6.10 | | |
| 3 | 8.000 | 2.00 | 1.49176 | 57.4 |
| 4 | — | | | |

FIGS. 2A–2D show aberration diagrams of the eyepiece lens system shown in FIG. 1. Specifically, FIG. 2A shows spherical aberration for d-line, g-line and C-line, FIG. 2B shows a lateral chromatic aberration for d-line, g-line and C-line, FIG. 2C shows astigmatism (S: sagital; and M: meridional), and FIG. 2D shows a distortion. A unit of measurement of a horizontal axis for FIGS. 2A–2C is "mm", and that for FIG. 2D is "%".

If the afore-mentioned condition of the Ramsden eyepiece lens is modified to elongate the eye relief as is done in the above example, the lateral chromatic aberration increases as shown in FIG. 2B. That is, in the above-described conventional eyepiece lens system shown in FIG. 1 which is intended to elongate the eye relief sufficiently, it is important to suppress the lateral chromatic aberration.

SUMMARY OF THE INVENTION

It is therefore an object of the invention to provide an eyepiece lens system having a relatively simple structure and having a sufficiently long eye relief with suppressing the chromatic aberration.

For the object, according to the invention, there is provided an eyepiece lens system for viewing an image, comprising: a first refraction lens having a positive power; a second refraction lens having a positive power; and at least one diffraction lens having a phase grating structure, wherein the first and second lenses are arranged on an eye side with respect to a plane on which the image is formed.

Optionally, each of the first and second lenses is a plano-convex lens, convex surfaces of the first and second lenses facing each other.

In one case, the diffraction lens may formed integrally on one of the surfaces of the first and second refraction lenses.

Alternatively, the diffraction lens may include a plurality of diffraction surfaces formed on a plurality of surfaces of the first and second lenses.

Further optionally, the diffraction lens may include a diffraction surface formed on a surface of the first lens, and the other surface of the first lens may be formed to be an aspherical surface.

In another case, the diffraction lens may be a diffraction element that is provided separately from the first and second lenses. In this case, diffraction element may be arranged between the first and second refraction lenses.

Still optionally, the diffraction lens may include a diffraction surface which is formed by a plurality of annular zones arranged concentrically with respect to an optical axis of the eyepiece lens system, a surface of each of the zones being perpendicular to the optical axis, a macroscopic shape of the diffraction surface being a concave surface.

Further optionally, the eyepiece lens system satisfies a condition:

$$f^2/100 < L,$$

where, f is a combined focal length of the lenses located on the eye side with respect to an image position, and L is a distance between the image position and an apparent position of a diffraction surface, viewed from the image position.

Alternatively or optionally, the eyepiece lens system may satisfy the following condition:

0.30<L/f, where, f is a combined focal length of the lenses located on the eye side with respect to an image position, and L is a distance between the image position and an apparent position of a diffraction surface, viewed from the image position.

According to another aspect of the invention, there is provided an eyepiece lens system for directing an image formed by an objective lens system to an eye, the eyepiece lens system comprising: a first lens group having a first power; a field stop; a second lens group having a second power, the second power being positive; and a third lens group having a third power, the third power being positive, wherein the first lens, the field stop, the second lens and the third lens are arranged in order from the objective lens side to the eye side, wherein, the first power is relatively weak with respect to the second power and the third power, and wherein the second lens group includes at least one lens, a diffraction surface having a positive power being formed on one surface of the lens included in the second lens group, the diffraction surface having a plurality of concentrically formed annular zones, and wherein steps, in a direction parallel to the optical axis, of the plurality of zones are greater at a portion apart from an optical axis of the optical axis than a portion close to the optical axis.

In particular case, the second lens group consists of a single lens. Alternatively, the second lens group consists of two lenses, and the diffraction surface is formed on one surface of each of the two lenses.

DESCRIPTION OF THE ACCOMPANYING DRAWINGS

FIGS. 3A through 3C show a first type of diffraction surface formed on a refraction lens;

FIGS. 4A through 4C show a second type of diffraction surface formed on a refraction lens;

FIGS. 5A through 5C show a third type of diffraction surface formed on a refraction lens;

FIG. 6 show a diagram showing a structure of an eyepiece lens system according to a first embodiment of the invention;

FIGS. 7A through 7D are graphs showing aberrations of the eyepiece lens system shown in FIG. 6;

FIG. 8 show a diagram showing a structure of an eyepiece lens system according to a second embodiment of the invention;

FIGS. 9A through 9D are graphs showing aberrations of the eyepiece lens system shown in FIG. 8;

FIG. 10 show a diagram showing a structure of an eyepiece lens system according to a third embodiment of the invention;

FIGS. 11A through 11D are graphs showing aberrations of the eyepiece lens system shown in FIG. 10;

FIG. 12 show a diagram showing a structure of an eyepiece lens system according to a fourth embodiment of the invention;

FIGS. 13A through 13D are graphs showing aberrations of the eyepiece lens system shown in FIG. 12;

FIG. 18 show a diagram showing a structure of an eyepiece lens system according to a seventh embodiment of the invention;

FIGS. 19A through 19D are graphs showing aberrations of the eyepiece lens system shown in FIG. 18;

DESCRIPTION OF THE EMBODIMENTS

Figure 1:
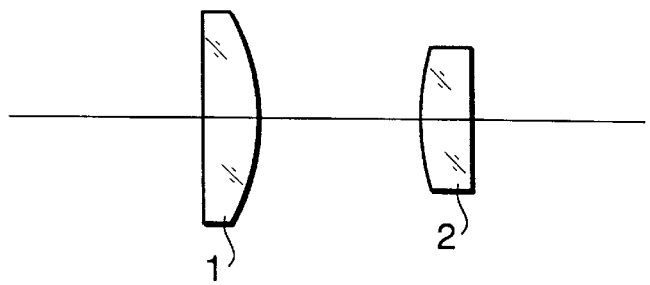
FIG. 1 is a diagram showing a structure of an example of a conventional eyepiece lens system.
Figure 2A:
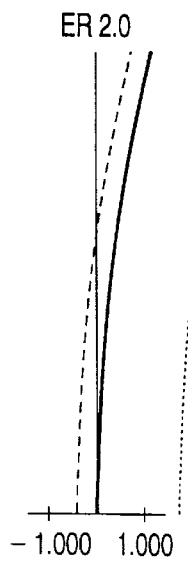
FIGS. 2A through 2D are graphs showing aberrations of the eyepiece lens system shown in FIG. 1.
Figure 2B:
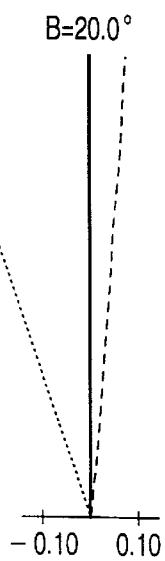
Figure 2C:
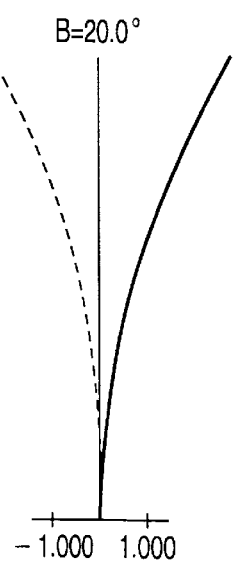
Figure 2D:
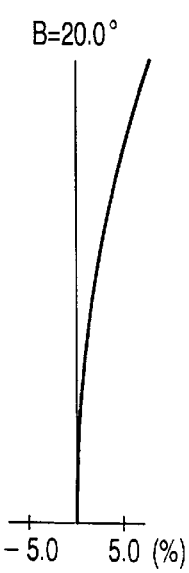

The present invention will be described with reference to the accompanying drawings. Each of the eyepiece lens systems according to the embodiments includes at least two refraction lenses and at least one phase grating, or a diffractive lens, having a positive power. Further, the eyepiece lens system of each embodiment is arranged between an image position and an eye of an observer to magnify the formed image. In the specification, the term "image position" is defined as a position where an real image is formed by the objective lens and/or a position of an image screen of an LCD (Liquid Crystal Display) or a CRT (Cathode Ray Tube).

A diffraction lens has a negative Abbe's number, and therefore by combining a diffraction lens having a positive power and a refraction lens having a positive power, a chromatic aberration can be compensated. With such a structure, the diffraction lens and the refraction lens can share the power, and therefore the power of the refraction lens can be reduced. For example, when a refraction lens is used in combination with a diffraction lens, the power of the refraction lens may be reduced to ⅔ of the power of a lens system in which the diffraction lens is not used. Since the power of the refraction lens is reduced, glass material of the refraction lens required to have relatively low refractive index, which contributes to reduce the manufacturing cost. Further, radius of curvature of the refraction lens surface can be made greater, and accordingly, the lateral chromatic aberration can also be reduced. Furthermore, when the diffraction lens is used, it is not necessary to use a refraction lens having a negative power to compensate the chromatic aberration. Therefore, the number of lenses can be suppressed and weight of the entire eyepiece lens system can also be suppressed.

The diffraction lens can be provided as a diffraction surface structure formed on a surface of a refraction lens, and/or can be provided as a diffraction element provided separately from the refraction lens(es).

In FIGS. 3A–3C, 4A–4C and 5A–5C, examples of diffraction lenses provided as diffraction surfaces formed on a refraction lens are illustrated. In each of the examples, the diffraction surface has a plurality of annular zones concentrically arranged with respect to an optical axis of the refraction lens, as shown in FIGS. 3A, 4A and 5A.

FIGS. 3A–3C show a case where the diffraction surface is formed on a surface S11 of a plano-convex type lens L10, the surface S11 having substantially no power. The diffraction surface has a plurality of concentric zones, and each zone has a surface extending perpendicular to an optical axis of the refraction lens (indicated as a microscopic shape in FIG. 3C). In this case, due to the diffraction surface structure, a macroscopic shape of the surface S11 becomes a concave surface as shown in FIG. 3C.

Since each zone has a surface which is perpendicular to the optical axis of the refraction lens, the lens having the diffraction surface, i.e., the lens having the zone structure, can be formed with use of a mold. When the mold is used, a manufacturing accuracy of the mold determines the accuracy of the diffraction surface, i.e., the accuracy of function of the diffraction lens. The mold may be manufactured using a lathe with a bit having a planar edge. In particular, a diamond bit, which has a planar edge having relatively high accuracy because of its crystal structure, may be preferably used. Since the bit surface-contacts the mold, the bit may not be worn easily and it is possible to cut the mold accurately as designed.

FIGS. 4A–4C show another case where the diffraction surface is formed on a surface S21 of a plano-convex type refraction lens L20, the surface S21 having substantially no power. In this case, the diffraction surface is formed as a Fresnel lens type structure having a plurality of zones whose surfaces are not perpendicular to the optical axis of the refraction lens L20. In this case, a macroscopic shape of the surface S21 is a flat surface, while a microscopic shape is as shown in FIG. 4C. In order to form the Fresnel lens type diffraction structure as shown in FIG. 4C, a lithographic method may be used.

FIGS. 5A–5C show another case where the diffraction surface is formed on a convex surface S31, which has a power, of a refraction lens L30. The diffraction surface also has a plurality of zones, a surface of each zone being not perpendicular to the optical axis of the refraction lens L30. In this case, a macroscopic shape of the convex surface S31 is similar to the shape when the diffraction surface is not formed, while the microscopic shape of the diffraction surface S31 is as shown in FIG. 5C.

It should be noted that, in the eyepiece lens system, light emitted from an object point diverges and is incident on a relatively small area of a lens surface that is closest to a field stop, and further an range of an incident angle at any point of the lens surface is relatively small. On the contrary, on a surface of a lens closer to the eye, the light emitted from an object point is incident on a relatively wide area of the surface, and accordingly the incident angle of a ray of light passing through a certain point on the lens surface varies within a relatively great range.

Since the diffraction lens having a phase grating structure is formed of material having limited refractive index, phase shift amount becomes greater for the greater incident angle. Thus, if the diffraction lens is formed on a surface closer to the eye, the phase shift amount varies greatly depending on the incident angle, and accordingly a diffraction efficiency of such a diffraction surface is lowered.

Therefore, in view of the diffraction efficiency, it is preferable to arrange the diffraction surface on a surface closer to a field stop (image position).

In view of visibility of the zones within the field of view, however, it is preferable that the diffraction surface is located as far from the image position as possible. Generally, if a difference between the diffraction surface and the image position corresponds to approximately 10 diopter, the zones within the field of view do not obstruct the view. Taking the aboves in consideration, it is concluded that the eyepiece lens system preferably satisfies condition (1) as follows.

$$f^2/100 < L \tag{1}$$

where, f is a combined focal length of the lenses located on the eye side with respect to the field stop (image position), and L is a distance between an image position and an apparent position of the diffraction surface viewed from the image position.

Condition (1) defines that a diopter difference between the apparent position of the diffraction surface and the apparent position of the image is greater than 10 diopters. If condition (1) is not satisfied, the zones may be conspicuous in the field of view and obstruct the view of the object image.

It is known that the lateral chromatic aberration can be compensated as the product of the height of a paraxial ray and the height of a marginal ray is greater. Therefore, if the diffraction surface is formed at a position close to the image position at which the height of the marginal ray is relatively low, or at a position close to the eye where the height of the paraxial ray is low, the power of the diffraction lens should be made relatively large. However, in order to increase the power of the diffraction lens, the width of each zone should be made smaller, and such zones are difficult to manufacture. Accordingly, it is preferable that the position (the apparent position) of the diffraction surface satisfies condition (2) below.

$$0.30 < L/f \tag{2}$$

where, as described above, f is a combined focal length the of the lenses located ont the eye side with respect to the field stop (image position), and L is a distance between the image position and the apparent position of the diffraction surface viewed from the image position.

If condition (2) is satisfied, the height of the marginal ray at the position of the diffraction surface is sufficiently high, the chromatic aberration can be compensated sufficiently without making the power of the diffraction lens excessively stronger, i.e., without narrowing the width of the zones excessively.

It is difficult to wipe off the dust adhered on the diffraction surface. Further, if the diffraction surface having the phase grating structure is applied with a relatively thick coating such has a hard coating, the steps of the diffraction surface structure may be filled by the coating and the diffraction surface may not function as designed. In such a case, unnecessary diffraction components may be generated and contrast of the image may be lowered. Therefore, it is preferable that the diffraction surface having the phase grating may be formed on a surface except the surface closest to the eye, and further, it is preferable that the diffraction surface is formed on a surface locaated inside the lens system where the dust or flaw may be hardly adhered.

In the eyepiece lens system, if dust or flaw is applied on a surface close to a position on which the eye focuses, the dust or flaw is clearly viewed within the field of view. Therefore, it is preferable that the lens located close to the field stop is arranged within an airtight portion. If a lens which has a relatively weak power is provided in front of (on the object side of) the field stop to seal the portion where the lens arranged close to the focal point, it becomes possible to make the dust or flaw inconspicuous within the field of view. Such a structure is especially effective for the eyepiece lens system used for a viewing optical system employing exchangeable eyepiece lens systems.

A single diffraction surface may work for two refraction lenses. In such a structure, however, the width of a zone should be narrower for the zone further from the optical axis, and accordingly, if the diameter of the lens is increased to obtain a wide angular range, it becomes difficult to manufacture the outer zones sufficiently narrow. If more than one diffraction surface is formed to share the function of compensating the lateral chromatic aberration, the widths of the zones of each diffraction surface can be made wider and the sufficient effect can be maintained.

Furthermore, a surface on which the diffraction surface is not formed may be formed as an aspherical surface to compensate coma, distortion and the like. In this case, a radius of curvature of the aspherical surface is smaller at a central portion of the surface, and is greater at an outer portion (i.e., a peripheral portion) thereof.

Hereinafter, eight numerical embodiments satisfying the above-described conditions (1) and (2) will be described.

First through fifth embodiments are eyepiece lens systems constructed as modified Ramsden eyepiece lens systems. That is, on the eye side with respect to a field stop, two positive lenses are arranged such that convex surfaces thereof face each other.

There are two lenses and accordingly the eyepiece lens system has four surfaces. In the description below, a first surface is the surface closest to the object, and a second surface, a third surface and a fourth surface are the surfaces arranged in the order from the object side to the eye side. In the first through fourth embodiments, the diffraction surface is formed unitarily on the first through fourth surfaces, respectively. In the fifth embodiment, a diffraction element is provided separately from the two refraction lenses and is arranged therebetween.

In the first, fourth and fifth embodiments, the diffraction surface is formed on a surface which does not have a power as a refraction lens, and the zones are formed as shown in FIG. 4C.

In the second, third, and sixth through eighth embodiments, the diffraction surface is formed on a surface which has a power as a refraction lens. In such embodiments, a macroscopic view of the diffraction surface is as shown in FIGS. 5B and 5C. It should be noted that when the phase grating is formed on a convex surface as shown in FIGS. 5B and 5C, the step between zones should be made greater for the zones located at outer portion, with respect to the optical axis, of the convex surface to adjust the phase.

In the embodiments described below, the diffraction surface is expressed by an optical pathlength difference function $\Delta\Phi$ and a radius of curvature of the macroscopic shape of the surface. The optical pathlength difference function indicates an optical pathlength to be added by the phase grating, and is defined as a function of a height h of a point on the diffraction surface with respect to the optical axis.

The optical pathlength difference function $\Delta\Phi$, i.e., the optical pathlength added by the diffraction lens is expressed as follows:

$$\Delta\Phi(h) = (P2h^2 + P4h^4 + P6h^6 + \ldots)\times\lambda$$

where, P2, P4, P6, . . . , are coefficients of second-order, fourth-order, sixth-order, . . . . In this expression, when P2 is negative, the diffraction surface has, in view of a paraxial ray, a positive power. When P4 is positive, a negative power increases toward the peripheral portion. $\lambda$ denotes the wavelength of light.

The actual microscopic shape of the diffraction surface to be realized is determined such that the components having the multiple integer of the wavelength is subtracted from the optical pathlength. The additional pathlength $\Delta\Phi'(h)$ is therefore defined as follows.

$$\Delta\Phi'(h) = (MOD(P2h^2 + P4h^4 + P6h^6 + \ldots + Const, 1) - Const)\times\lambda$$

where, a constant term Const is for setting the phase of the border between the zones and has a value equal to 0 or greater, and less than 1. MOD(x, y) is a function which gives a remainder when x is divided by y. The values of h when $MOD(P2h^2 + P4h^4 + P6h^6 + \ldots + Const, 1)$ equals 0 indicates the border of the zones. On a base shape (i.e., the shape of the surface of the refraction lens), zones (i.e., inclination of surfaces, and steps) are set so that the additional optical pathlength $\Delta\Phi'(h)$ is obtained. In the following embodiments, the constant Const equals 0.5.

[First Embodiment]

FIG. 6 shows a lens structure of an eyepiece lens system 100 according to the first embodiment. Macroscopically, the eyepiece lens system shown in FIG. 6 is configured as a modified Ramsden type. The eyepiece lens system 100 includes, as shown in FIG. 6, a first lens 10 having a substantially plano-convex shape, a second lens 11 having a plano-convex shape. A second surface 10b of the first lens 10 and a third surface 11a of the second lens 11 (i.e., convex surfaces of the first and second lenses 10 and 11) face each other. In this embodiment, the diffraction surface is formed on a first surface 10a of the first lens 10.

The numerical structure is indicated in Table 2. In Table 2, ER denotes a diameter of an eye ring, B denotes an angle of an emitted ray with respect to the optical axis of the eyepiece lens system 100, f denotes a focal length of the eyepiece lens system 100, fa denotes a combined focal length of lenses loaced on the eye side with respect to the field stop, L denotes a distance between an image position and an apparent position of the diffraction surface, P2, P4, P6 are a second-order, a fourth-order, and a sixth-order coefficients of the optical pathlength difference function, fd is a focal length of the diffraction surface with respect to a diffracted component for d-line (588 nm), $\Phi(h)$ is a value of the optical pathlength difference function at a height, with respect to the optical axis, of h, r denotes the radius of curvature of each surface, d denotes a lens thickness or a distance between lenses, n denotes a refractive index of each lens for d-line, and $\nu$ denotes an Abbe's number for each lens. "S" in the column of the "surface number" indicates a position of the field stop which is indicated by a broken line and labeled as "S" in FIG. 6. Further, in Table 2, * denotes the surface on which the diffraction surface is formed.

TABLE 2

| ER = 2.0 mm | B = ±20.0° | f = fa = 10.01 mm | L = 4.82 mm |
|---|---|---|---|
| P2 = −8.0482 | P4 = 0.0000 | P6 = 0.0000 | |
| fd = 105.73 | $\phi$(3.872) = −120.6$\lambda$ | | |

| Surface Number | r | d | n | $\nu$ |
|---|---|---|---|---|
| S | — | 4.82 | | |
| 1* | −52.000 | 2.00 | 1.49176 | 57.4 |
| 2 | −8.000 | 6.10 | | |
| 3 | 8.000 | 2.00 | 1.49176 | 57.4 |
| 4 | ∞ | | | |

FIGS. 7A–7D show aberration diagrams of the eyepiece lens system 100 according to the first embodiment. Specifically, FIG. 7A shows spherical aberration for d-line, g-line and C-line, FIG. 7B shows a lateral chromatic aberration for g-line and C-line, FIG. 7C shows astigmatism (S:

sagital; and M: meridional), and FIG. 7D shows a distortion. In graphs shown in FIGS. 7A–7D, a unit of measurement of a horizontal axis for FIGS. 7A–7C is "mm", and a unit of measurement for FIG. 7D is "%".

It should be noted that the eyepiece lens system 100 is similar to the afore-mentioned conventional eyepiece lens system except that the eyepiece lens system 100 includes the diffraction surface. By comparing FIGS. 7A–7D with FIGS. 2A–2D, it can be clearly understood that the lateral chromatic aberration and the longitudinal chromatic aberration can be well compensated when the diffraction surface is provided.

[Second Embodiment]

FIG. 8 shows a lens structure of an eyepiece lens system 200 according to the second embodiment. Macroscopically, the eyepiece lens system shown in FIG. 8 is a modified Ramsden type. The eyepiece lens system 200 includes, as shown in FIG. 8, a first lens 12 having a plano-convex shape, a second lens 13 having a plano-convex shape. A second surface 12b of the first lens 12 and a third surface 13a of the second lens 13 (i.e., convex surfaces of the first and second lenses 12 and 13) face each other. In this embodiment, the diffraction surface is formed on the second surface 12b of the first lens 12. A position of the field stop S is indicated by a broken line. The numerical structure is indicated in Table 3, and various types of aberrations are illustrated in FIGS. 9A through 9D.

TABLE 3

ER = 2.0 mm   B = ±20.0°   f = fa = 10.01 mm   L = 6.16 mm
P2 = −5.8121   P4 = 0.0000   P6 = 0.0000
fd = 146.41   φ(3.965) = −91.4λ

| Surface Number | r | d | n | ν |
|---|---|---|---|---|
| S | — | 4.82 | | |
| 1 | ∞ | 2.00 | 1.49176 | 57.4 |
| 2* | −9.000 | 6.10 | | |
| 3 | 8.000 | 2.00 | 1.49176 | 57.4 |
| 4 | ∞ | | | |

[Third Embodiment]

FIG. 10 shows a lens structure of an eyepiece lens system 300 according to the third embodiment. Macroscopically, the eyepiece lens system shown in FIG. 10 is a modified Ramsden type. The eyepiece lens system 300 includes, as shown in FIG. 10, a first lens 14 having a plano-convex shape, a second lens 15 having a plano-convex shape. A second surface 14b of the first lens 14 and a third surface 15a of the second lens 15 (i.e., convex surfaces of the first and second lenses 14 and 15) face each other. In this embodiment, the diffraction surface is formed on the third surface 1Sa of the second lens 15. A position of the field stop S is indicated by a broken line. The numerical structure is indicated in Table 4, and various types of aberrations are illustrated in FIGS. 11A through 11D.

TABLE 4

ER = 2.0 mm   B = ±20.0°   f = fa = 10.01 mm   L = 15.92 mm
P2 = −7.3126   P4 = 0.0000   P6 = 0.0000
fd = 116.37   φ(2.575) = −45.8λ

| Surface Number | r | d | n | ν |
|---|---|---|---|---|
| S | — | 4.82 | | |
| 1 | ∞ | 2.00 | 1.49176 | 57.4 |

TABLE 4-continued

| 2 | −8.000 | 6.10 | | |
| 3* | 9.300 | 2.00 | 1.49176 | 57.4 |
| 4 | ∞ | | | |

[Fourth Embodiment]

FIG. 12 shows a lens structure of an eyepiece lens system 400 according to the fourth embodiment. Macroscopically, the eyepiece lens system shown in FIG. 12 is a modified Ramsden type. The eyepiece lens system 300 includes, as shown in FIG. 10, a first lens 16 having a plano-convex shape, a second lens 17 having a plano-convex shape. A second surface 16b of the first lens 16 and a third surface 17a of the second lens 17 (i.e., convex surfaces of the first and second lenses 16 and 17) face each other. In this embodiment, the diffraction surface is formed on the fourth surface 17a of the second lens 17. A position of the field stop S is indicated by a broken line. The numerical structure is indicated in Table 5, and various types of aberrations are illustrated in FIGS. 13A through 13D.

TABLE 5

ER = 2.0 mm   B = ±20.0°   f = fa = 10.01 mm   L = 20.29 mm
P2 = −10.4618   P4 = 0.0000   P6 = 0.0000
fd = 81.34   φ(3.872) = −49.8λ

| Surface Number | r | d | n | ν |
|---|---|---|---|---|
| S | — | 4.82 | | |
| 1 | ∞ | 2.00 | 1.49176 | 57.4 |
| 2 | −8.000 | 6.10 | | |
| 3 | 8.000 | 2.00 | 1.49176 | 57.4 |
| 4* | 40.000 | | | |

[Fifth Embodiment]

Figure 14:
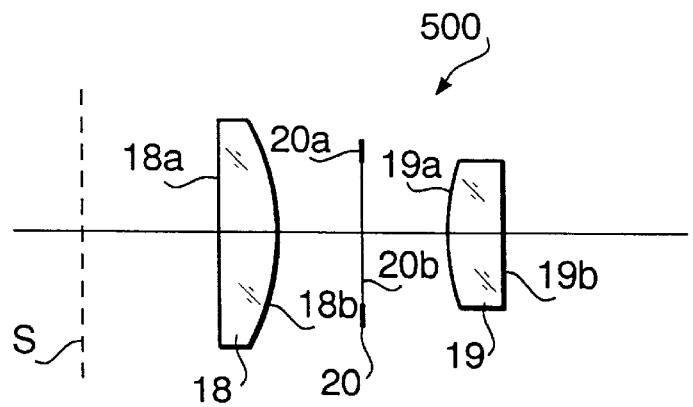
FIG. 14 show a diagram showing a structure of an eyepiece lens system according to a fifth embodiment of the invention.
Figures 15A, 15B, 15C, 15D:
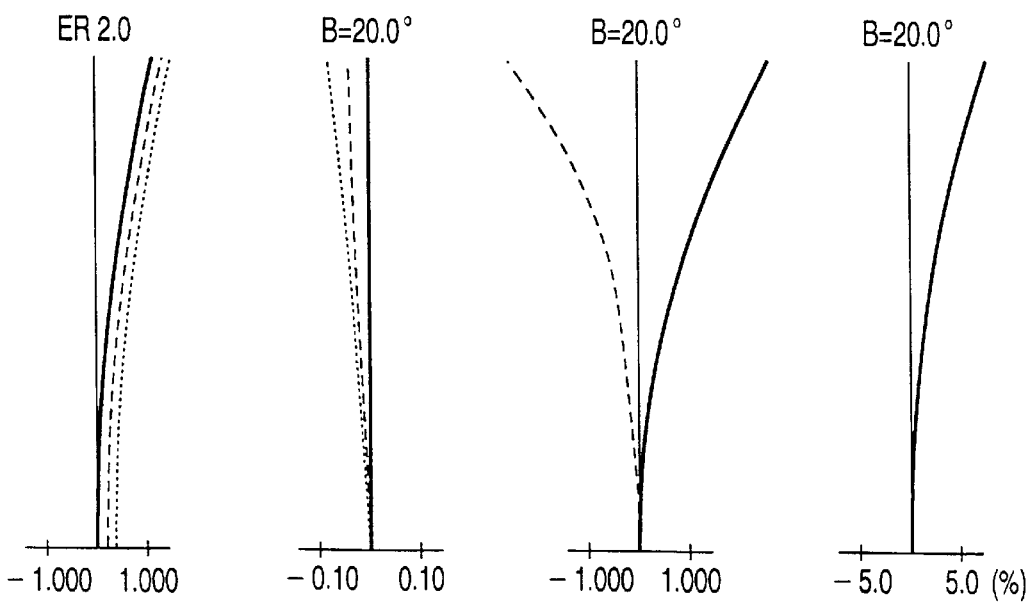
FIGS. 15A through 15D are graphs showing aberrations of the eyepiece lens system shown in FIG. 14.

FIG. 14 shows a lens structure of an eyepiece lens system 500 according to the fifth embodiment. The eyepiece lens system shown in FIG. 14 is a modified Ramsden type. The eyepiece lens system 500 includes, as shown in FIG. 14, a first lens 18 having a plano-convex shape, a second lens 19 having a plano-convex shape. The convex surfaces of the first and second lenses 18 and 19 face each other. In this embodiment, a diffraction element 20 on which the diffraction surface is formed is inserted between the first and second lenses 18 and 19. Thus, the diffraction surface is formed on the third surface 20a of the diffraction element 20. A position of the field stop S is indicated by a broken line. The numerical structure is indicated in Table 6, and various types of aberrations are illustrated in FIGS. 15A through 15D.

TABLE 6

ER = 2.0 mm   B = ±20.0°   f = fa = 10.01 mm   L = 9.99 mm
P2 = −6.4386   P4 = 0.0000   P6 = 0.0000
fd = 132.17   φ(3.872) = −132.2λ

| Surface Number | r | d | n | ν |
|---|---|---|---|---|
| S | — | 4.82 | | |
| 1 | ∞ | 2.00 | 1.49176 | 57.4 |
| 2 | −8.000 | 3.10 | | |
| 3* | −65.000 | 0.00 | 1.49176 | 57.4 |
| 4 | ∞ | 3.00 | | |
| 5 | 8.000 | 2.00 | 1.49176 | 57.4 |
| 6 | ∞ | | | |

It should be noted that, in the fifth embodiment, the diffraction element is regarded as an element having the thickness of 0 (zero). In practice, the element has a certain thickness, and accordingly, the distance between the first and second lenses 18 and 19 should be changed in accordance with the thickness of the diffraction element 20 and the refractive index thereof.

In the above-described first through fourth embodiments, compensation of the lateral chromatic aberration is a primary object when designed, and therefore some longitudinal chromatic aberration remains. As is understood from the aberration diagram, if the lateral chromatic aberration of the first through fourth embodiments is made similar, the longitudinal chromatic aberration of the first and second embodiments is compensated insufficiently, and the longitudinal chromatic aberration of the third and fourth embodiments are over-compensated. When the diffraction surface is provides as a separate element as in the fifth embodiment, the longitudinal chromatic aberration can also be compensated sufficiently.

The sixth through eighth embodiments are applicable to view an image formed by an objective lens, and a lens having a relatively weak power is arranged on the object side with respect to the image position. That is, the image is formed inside the eyepiece lens system. When the eyepiece lens system is used for viewing the image formed by the objective lens, by arranging a negative lens on the objective lens side, curvature of field and distortion can be compensated well.

[Sixth Embodiment]

Figure 16:
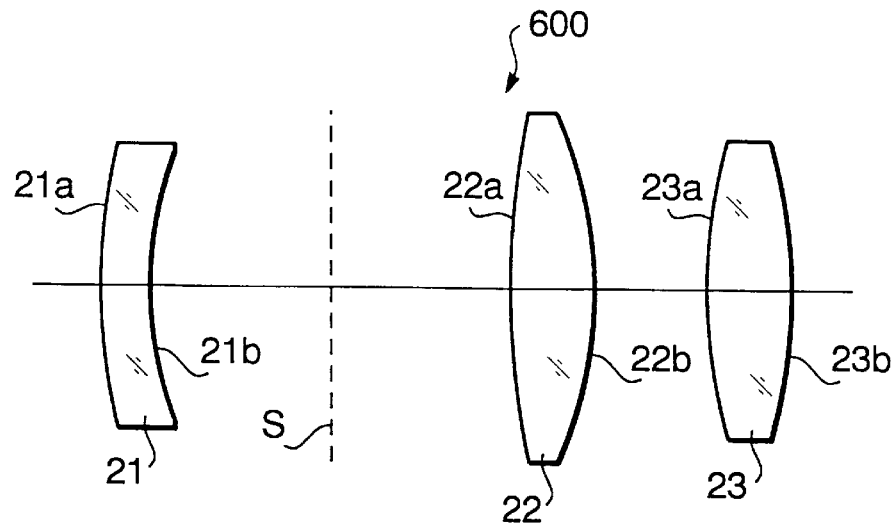
FIG. 16 show a diagram showing a structure of an eyepiece lens system according to a sixth embodiment of the invention.
Figure 17A:
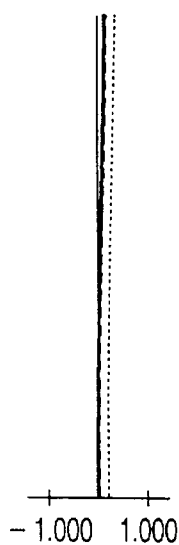
FIGS. 17A through 17D are graphs showing aberrations of the eyepiece lens system shown in FIG. 16.
Figure 17B:
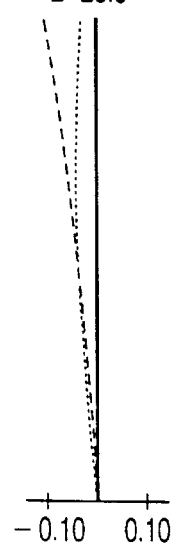
Figure 17C:
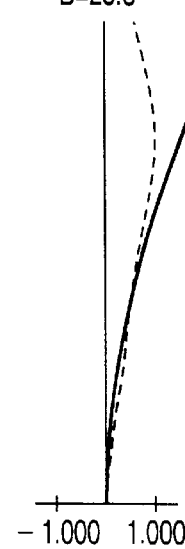
Figure 17D:
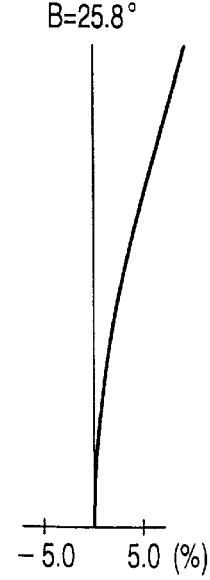

FIG. 16 shows a lens structure of an eyepiece lens system 600 according to the sixth embodiment. The eyepiece lens system shown in FIG. 16 has an field stop S located on an image plane, and on the object side of the field stop S, a first lens group, or a negative meniscus lens 21 is arranged. On the eye side with respect to the field stop S, a second lens group, or a double convex lens 22, and a third lens group, or a double convex lens 23 are arranged. When surfaces 21a, 21b, 22a, 22b, 23a, 23b of the negative meniscus lens 21, the double convex lens 22, and the double convex lens 23 are defined as a first through sixth surfaces, the diffraction surface is formed on the third surface 22a. The numerical structure is indicated in Table 7, and various types of aberrations are illustrated in FIGS. 17A through 17D.

It should be noted that, in the sixth embodiment, the fourth surface 22b is formed to be a rotation-symmetrical aspherical surface. The aspherical surface is expressed by the equation below, $$X = Ch^2 \Big/ \left(1 + \sqrt{1 - (1+K)C^2 h^2}\right) + A4h^4 + A6h^6$$

where, x denotes a sag amount (i.e., a distance between a point on the aspherical surface, whose height with respect of the optical axis is h, and a tangential plane to the aspherical surface at a point where the optical axis intersects the aspherical surface), C denotes a curvature (1/r) of the aspherical surface on the optical axis, K denotes a conical coefficient, A4 and A6 denote aspherical coefficients for fourth-order and sixth-order. The conical coefficient K and the aspherical coefficients A4 and A6 are indicated in Table 8.

TABLE 7

ER = 4.1 mm   B = ±25.8°   f = 20.41 mm   fa = 22.01 mm
L = 12.78 mm   P2 = −3.75644   P4 = −2.82834 × 10$^{−4}$
P6 = −4.4528 × 10$^{−8}$   fd = 226.538 mm   $\phi$(12.61) = −604.8 $\lambda$

| Surface Number | r | d | N | v |
|---|---|---|---|---|
| 1 | 41.839 | 3.50 | 1.51633 | 64.1 |
| 2 | 24.230 | 13.28 | | |
| S | — | 12.78 | | |
| 3* | 57.698 | 6.00 | 1.49176 | 57.4 |
| 4 | −27.404 | 6.14 | | |
| 5 | 41.848 | 6.00 | 1.51633 | 64.1 |
| 6 | −41.848 | | | |

TABLE 8

K = 0.000   A4 = 9.260 × 10$^{−6}$   A6 = 4.300 × 10$^{−8}$

[Seventh Embodiment]

FIG. 18 shows a lens structure of an eyepiece lens system 700 according to the seventh embodiment. Similarly to the sixth embodiment, the eyepiece lens system shown in FIG. 18 has an field stop S located on an image plane, and on the object side of the field stop S, a first lens group, or a negative meniscus lens 24 is arranged. On the eye side with respect to the field stop S, a second lens group, or a double convex lens 25, and a third lens group, or a double convex lens 26 are arranged. When surfaces 24a, 24b, 25a, 25b, 26a, 26b of the negative meniscus lens 24, the double convex lens 25, and the double convex lens 26 are defined as a first through sixth surfaces, the diffraction surface is formed on the fourth surface 25b. In the seventh embodiment, the third surface 25a is formed as the rotation-symmetrical aspherical surface. The numerical structure is indicated in Table 9, the conical coefficient K and the aspherical coefficients A4 and A6 are indicated in Table 10, and various types of aberrations are illustrated in FIGS. 19A through 19D.

TABLE 9

ER = 4.0 mm   B = ±26.0°   f = 20.15 mm   fa = 22.31 mm
L = 19.98 mm   P2 = −1.66806   P4 = −4.5862 × 10$^{−4}$
P6 = −4.2402 × 10$^{−7}$   fd = 510.162 mm   $\phi$(13.91) = −342.2 $\lambda$

| Surface Number | r | d | N | v |
|---|---|---|---|---|
| 1 | 40.896 | 3.50 | | |
| 2 | 21.805 | 13.63 | 1.51633 | 64.1 |
| S | — | 14.32 | | |
| 3 | 49.664 | 8.00 | 1.49176 | 57.4 |
| 4* | −29.989 | 3.80 | | |
| 5 | 45.922 | 6.00 | 1.51633 | 64.1 |
| 6 | −44.700 | | | |

TABLE 8

K = 0.000   A4 = −2.240 × 10$^{−5}$   A6 = 1.560 × 10$^{−8}$

[Eighth Embodiment]

Figure 20:
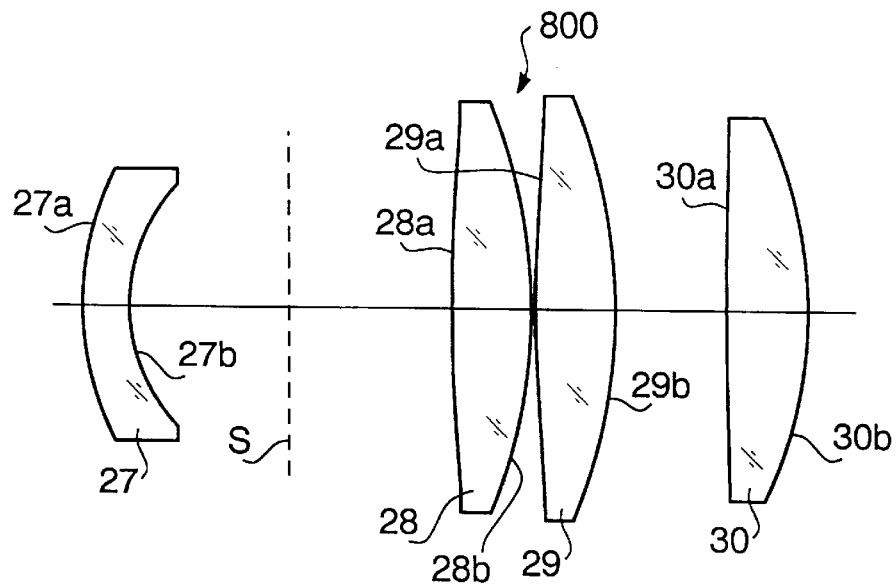
FIG. 20 show a diagram showing a structure of an eyepiece lens system according to a eighth embodiment of the invention.
Figure 21A:
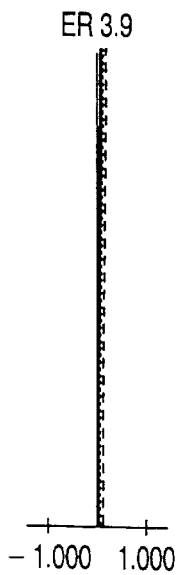
FIGS. 21A through 21D are graphs showing aberrations of the eyepiece lens system shown in FIG. 20.
Figure 21B:
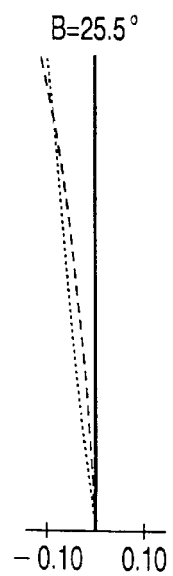
Figure 21C:
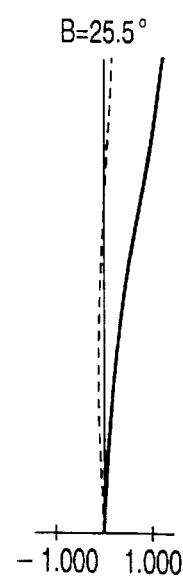
Figure 21D:
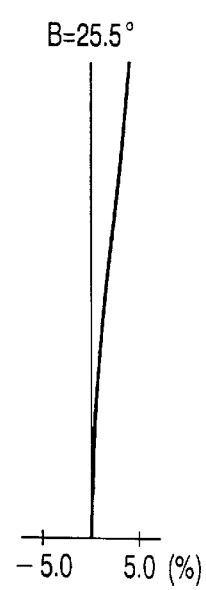

FIG. 20 shows a lens structure of an eyepiece lens system 800 according to the eighth embodiment. The eyepiece lens system shown in FIG. 20 has an field stop S located on an image plane, and on the object side of the field stop S, a first lens group, or a negative meniscus lens 27 is arranged. On the eye side with respect to the field stop S, a second lens group consisting of two double convex lenses 28 and 29, and a third lens group consisting of a double convex lens 30 are arranged. When surfaces 27*a*, 27*b*, 28*a*, 28*b*, 29*a*, 29*b*, 30*a* and 30*b* of the negative meniscus lens 27, the double convex lenses 28, 29 and 30 are defined as a first through eighth surfaces, the fourth surface 28*b* and the sixth surface 29*b* are formed to be the diffraction surfaces. The structure of the diffraction surface formed on the fourth and sixth surfaces 28*b* and 29*b* are similar to each other. Further, in the eighth embodiment, the third surface 28*a* and the fifth surface 29*a* are formed as the rotation-symmetrical aspherical surfaces. The numerical structure is indicated in Table 11, the conical coefficient K and the aspherical coefficients A4 and A6 are indicated in Table 12, and various types of aberrations are illustrated in FIGS. 21A through 21D.

In table 11, L1 denotes a distance between an image position and an apparent position, when viewed from the image position, of the first diffraction surface (i.e., the fourth surface 28*b*), L2 denotes a distance between the image position and an apparent position of the second diffraction surface (i.e., the sixth surface 29*b*), $\Phi(16.33)$ denotes a value of the optical pathlength difference function for the sixth surface 29*b*.

TABLE 11

ER = 3.9 mm   B = ±25.5°   f = 19.56 mm   fa = 22.23 mm
L1 = 15.32 mm   L2 = 20.30 mm   P2 = −1.53128   P4 = −2.3334 × $10^{-4}$
P6 = −8.3898 × $10^{-8}$   fd = 555.73 mm   $\phi(15.67)$ = −391.3 λ
$\phi(16.33)$ = −426.5 λ

| Surface Number | r | d | N | ν |
|---|---|---|---|---|
| 1 | 22.800 | 3.50 | | |
| 2 | 12.752 | 12.27 | 1.51633 | 64.1 |
| S | — | 11.20 | | |
| 3 | 81.397 | 6.00 | 1.49176 | 57.4 |
| 4* | −40.406 | 0.20 | | |
| 5 | 81.397 | 6.00 | 1.49176 | 57.4 |
| 6* | −40.406 | 8.08 | | |
| 7 | 263.618 | 6.00 | 1.51633 | 64.1 |
| 8 | −34.249 | | | |

TABLE 12

K = 0.000   A4 = −1.500 × $10^{-5}$   A6 = 1.000 × $10^{-9}$

In Table 13 below, values corresponding to conditions (1) and (2) for the above-described embodiments are indicated. In each embodiment, the conditions (1) and (2) are satisfied, and accordingly, the zones do not obstruct the field of view. Further, the height of the marginal ray at the diffraction surface is sufficiently high, and accordingly, the lateral chromatic aberration can be sufficiently compensated without making the power of the diffraction lens so strong.

TABLE 13

| Embodiment | diffraction surface/ | condition (1) $f^2/L$ | condition (2) L/f |
|---|---|---|---|
| 1 | 1st | 20.8 | 0.482 |
| 2 | 2nd | 16.3 | 0.615 |
| 3 | 3rd | 6.3 | 1.590 |
| 4 | 4th | 4.9 | 2.027 |
| 5 | 3rd | 10.0 | 0.998 |
| 6 | 3rd | 32.6 | 0.626 |
| 7 | 4th | 24.9 | 0.992 |
| 8 | 4th | 32.3 | 0.783 |
| 8 | 6th | 24.3 | 1.038 |

As described above, according to the invention, at least one diffraction lens is provided in the two positive refraction lens. With this structure, with keeping a predetermined eye relief, the chromatic aberration can be compensated effectively.

The present disclosure relates to subject matter contained in Japanese Patent Application No. HEI 09-147273, filed on May 21, 1997, which is expressly incorporated herein by reference in its entirety.

What is claimed is:

1. An eyepiece lens system for viewing an image formed by an objective lens system, said eyepiece lens system consisting of:

a first refraction lens having a positive power;

a second refraction lens having a positive power; and one of said first refraction lens and said second refraction lens having a diffraction surface, said diffraction surface comprising a phase grating structure;

wherein said first and second lenses are arranged on an eye side with respect to a plane on which said image is formed.

2. The eyepiece lens system according to claim 1, wherein each of said first and second lenses is a plano-convex lens, convex surfaces of said first and second lenses facing each other.

3. The eyepiece lens system according to claim 1, wherein said at least one diffraction lens includes a diffraction surface formed on a surface of said first lens, the other surface of said first lens being formed to be an aspherical surface.

4. The eyepiece lens system according to claim 1, wherein said at least one diffraction lens includes a diffraction surface which is formed by a plurality of annular zones arranged concentrically with respect to an optical axis of said eyepiece lens system, a surface of each of said zones being perpendicular to said optical axis, a macroscopic shape of said diffraction surface being a concave surface.

5. The eyepiece lens system according to claim 1, which satisfies a condition:

$$f^2/100 < L,$$

wherein, f is a combined focal length of lenses located on an eye side with respect to an image position, wherein L is a distance between said image position and an apparent diffraction surface, viewed from said image position.

6. The eyepiece lens system according to claim 1, which satisfies a condition:

$$0.30 < L/f,$$

wherein, f is a combined focal length of lenses located on an eye side with respect to an image position, and wherein L is a distance between said image position and an apparent diffraction surface, viewed from said image position.

7. An eyepiece lens system for directing an image formed by an objective lens system to an eye, said eyepiece lens system comprising:

a first lens group having a first power;

a field stop;

a second lens group having a second power, said second power being positive; and a third lens group having a third power, said third power being negative, wherein said first lens, said field stop, said second lens and said third lens are arranged in order from said objective lens side to said eye side, said field stop being positioned on an image plane within the eyepiece lens system, wherein, said first power is relatively weak with respect to said second power and said third power, and wherein said second lens group includes at least one lens, a diffraction surface having a positive power being formed on one surface of said at least one lens included in said second lens group, said diffraction surface having a plurality of concentrically formed annular zones.

8. The eyepiece lens system according to claim 7, wherein said second lens group consists of a single lens.

9. The eyepiece lens system according to claim 7, wherein said second lens group consists of two lenses, said diffraction surface being formed on one surface of each of said two lenses.

10. The eyepiece lens system according to claim 7, said first lens group being positioned on an objective lens side of said image plane.

11. An eyepiece lens system for viewing an image formed by an objective lens system, said eyepiece lens system consisting of:

a first refraction lens having a positive power;

a second refraction lens having a positive power; and a phase grating structure integrally formed on one of a surface of said first refraction lens and said second refraction lens;

wherein said first refraction lens and said second refraction lens are positioned on an eye side with respect to a plane on which the image is formed.

* * * * *